(12) United States Patent
Athalye et al.

(10) Patent No.: US 7,690,692 B2
(45) Date of Patent: Apr. 6, 2010

(54) ELECTROSTATIC DISCHARGE SOLUTION FOR ANGLED FUEL PORT OF A FUEL PUMP

(75) Inventors: Parag Athalye, Auburn Hills, MI (US); John Patrick Wattai, Rochester Hills, MI (US); Matthias Nederegger, Rochester Hills, MI (US); Stephane Seps, Detroit, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 372 days.

(21) Appl. No.: 11/889,472

(22) Filed: Aug. 14, 2007

(65) Prior Publication Data
US 2008/0042439 A1    Feb. 21, 2008

Related U.S. Application Data

(60) Provisional application No. 60/839,344, filed on Aug. 21, 2006.

(51) Int. Cl.
*F16L 33/00* (2006.01)
(52) U.S. Cl. .................. 285/239; 285/423; 210/243
(58) Field of Classification Search ............. 285/239, 285/241, 242, 252, 54, 423; 210/243; 361/212, 361/215
See application file for complete search history.

(56) References Cited

U.S. PATENT DOCUMENTS

| | | | | |
|---|---|---|---|---|
| 2,108,759 A | * | 2/1938 | Turman ................ 252/511 |
| 4,635,972 A | * | 1/1987 | Lyall .................... 285/242 |
| 5,320,078 A | * | 6/1994 | Lorraine ................ 123/468 |
| 5,382,359 A | * | 1/1995 | Brandt .................. 210/243 |
| 5,799,986 A | * | 9/1998 | Corbett et al. ........... 285/55 |
| 6,171,492 B1 | * | 1/2001 | Hedgepeth et al. ...... 210/243 |
| 6,279,966 B1 | * | 8/2001 | Kondo et al. ........... 285/319 |
| 6,402,205 B1 | * | 6/2002 | Rose et al. ............. 285/319 |
| 6,442,012 B2 | * | 8/2002 | Koike et al. ............ 361/212 |
| 6,453,870 B1 | * | 9/2002 | Koller et al. ......... 123/198 E |
| 6,508,374 B1 | * | 1/2003 | Griffin et al. .......... 220/304 |
| 6,589,420 B1 | * | 7/2003 | Mathew ................ 210/243 |
| 6,755,206 B2 | * | 6/2004 | Nishi et al. ............ 137/202 |
| 6,969,463 B2 | * | 11/2005 | Mathew ............... 210/243 |
| 7,014,214 B2 | * | 3/2006 | Kaneko ............... 285/141.1 |
| 7,322,617 B2 | * | 1/2008 | Paquis ................. 285/239 |
| 2009/0230674 A1 | * | 9/2009 | Villaire et al. ......... 285/179 |

OTHER PUBLICATIONS

Co-pending U.S. Appl. No. 11/889,473, filed Aug. 14, 2007.
Co-pending U.S. Appl. No. 11/826,280, filed Jul. 13, 2007.
Co-pending U.S. Appl. No. 11/889,474, filed Aug. 14, 2007.
Co-pending U.S. Appl. No. 11/822,649, filed Jul. 9, 2007.
Co-pending U.S. Appl. No. 11/889,468, filed Aug. 14, 2007.

* cited by examiner

*Primary Examiner*—David E Bochna

(57) ABSTRACT

Fuel port structure (10) of a fuel pump (20) includes a fuel port (12) having a periphery (14), an internal portion defining a fuel passage (16), and a free end (18). An electrically conductive grounding structure (22) has a first portion (24) disposed at least partially within the fuel passage and a second portion (26) extending from the free end. A fuel delivery tube (28) is coupled to the periphery of the fuel port at the free end thereof. The fuel delivery tube has an electrically conductive portion (30) in contact with the second portion of the grounding structure to provide a discharge path for static electricity created when fuel flows through the fuel passage.

13 Claims, 1 Drawing Sheet

US 7,690,692 B2

ELECTROSTATIC DISCHARGE SOLUTION FOR ANGLED FUEL PORT OF A FUEL PUMP

This application claims the benefit of the earlier filing date of U.S. Provisional Application No. 60/839,344, filed on Aug. 21, 2006, which is hereby incorporated by reference into this specification.

FIELD OF THE INVENTION

The invention relates to fuel supply systems for automobile vehicles and, more particularly, to provide for electrostatic dissipation by grounding through a fuel pump outlet.

BACKGROUND OF THE INVENTION

Recently, there has been a greater focus on Electro Static Dissipation (ESD) in vehicle fuel supply systems. It is known that as fuel flows through various components of the fuel supply system, such as the fuel pump assembly, the fuel filter, and various valving and tubing, there is the potential for static electricity to be generated in the various conductive components of the fuel supply system. To dissipate this static electricity, fuel supply systems electrically ground the components through electrical interconnection. For example, some systems employ a separate cable harness which grounds through the pump negative. Other systems employ grounding clips that touch the inline filter.

There is a need to provide for ESD at an outlet of a fuel pump without requiring the fuel pump outlet port to be electrically conductive.

SUMMARY OF THE INVENTION

An object of the invention is to fulfill the need referred to above. In accordance with the principles of the present invention, this objective is obtained by providing fuel port structure of a fuel pump. The fuel port structure includes a fuel port having a periphery, an internal portion defining a fuel passage, and a free end. An electrically conductive grounding structure has a first portion disposed at least partially within the fuel passage and a second portion extending from the free end. A fuel delivery tube is coupled to the periphery of the fuel port at the free end thereof. The fuel delivery tube has an electrically conductive portion in contact with the second portion of the grounding structure to provide a discharge path for static electricity created when fuel flows through the fuel passage.

In accordance with another aspect of the disclosed embodiment, a method is provided for grounding a fuel port of a fuel pump. The fuel port has a periphery, an internal portion defining a fuel passage, and a free end. A first portion of an electrically conductive grounding structure is inserted into fuel passage with a second portion of the grounding structure extending from the free end of the fuel port and accessible at the periphery of the fuel port. A tube is coupled to the to the periphery of the fuel port at the free end thereof such that an electrically conductive portion of the tube contacts the second portion of the grounding structure to provide a discharge path for static electricity created when fuel flows through the fuel passage.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
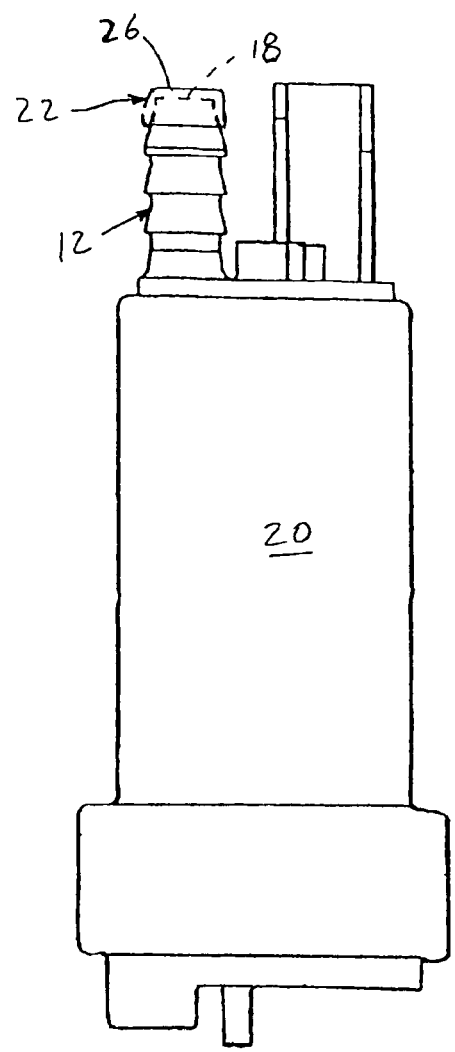
FIG. 1 is a front view of a fuel pump for a vehicle including a grounding structure coupled with an fuel port of the fuel pump in accordance with an embodiment of the present invention.
Figure 2:
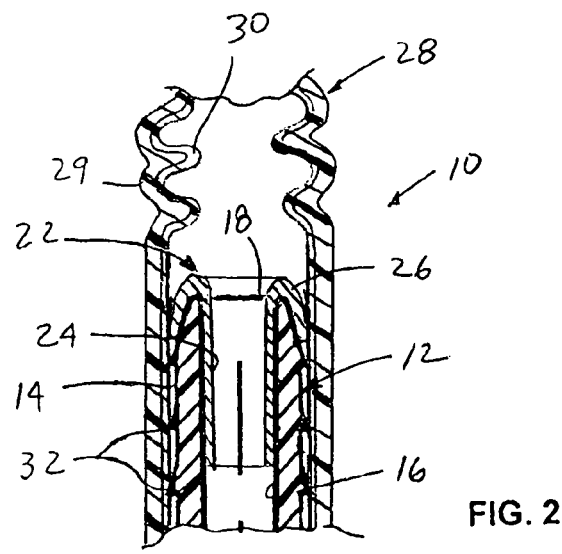
FIG. 2 is an enlarged sectional view of grounding structure and fuel port of FIG. 1, shown with a convoluted tube coupled therewith.

With reference to FIG. 2, a fuel port structure of a fuel pump is shown, generally indicated at 10, in accordance with an embodiment of the invention. The fuel port structure 10 includes a fuel port, generally indicated at 12, having a periphery 14, an internal portion defining a fuel passage 16, and a fee end 18. With reference to FIG. 1, fuel port 12 is preferably an outlet port of a vehicle fuel pump 20.

The fuel port structure 10 is of non-conductive plastic material and includes an electrically conductive grounding structure, generally indicated at 22, has a first portion 24 disposed at least partially within the fuel passage 16 and a second portion 26 extending from the free end 18 of the fuel port. In the embodiment, the fuel passage 16 is generally annular and the first portion 24 of the grounding structure 22 is of generally cylindrical shape. The second portion 26 of the grounding structure 22 is in the form of an annular rim bending over the free end 18 of the fuel port 12 so as to cover a portion of the periphery 14 thereof. The grounding structure 22 is preferably a metal member in press-fit engagement with the fuel port 12.

With reference to FIG. 2, the fuel port structure 10 also includes a fuel delivery tube, generally indicated at 28, coupled to the periphery 14 of the fuel port 12 at the free end 18 thereof. The fuel delivery tube 28 has an outer non-conductive plastic portion 29 and an electrically conductive portion 30 in contact with the second portion 26 of the grounding structure 22 to provide a discharge path for static electricity that is created by fuel flowing through the fuel passage as will be explained more fully below. In the embodiment the electrically conductive portion 30 is an inner surface of the tube 28 and the annular rim 26 of the grounding structure 22 contacts the inner surface. The tube 28 is preferably a convoluted tube for ease of bending and routing. An end of the tube 28 is engaged with barbs 32 on the periphery 14 of the fuel port 12. The entire tube 28 can be made of conductive plastic, but providing the conductive layer 30 improves the strength of the tube 28.

Thus, since the grounding structure 22 is in contact with the electrically conductive portion 30 of the tube 28, ESD can be grounded through the tube 28 external to the fuel pump. Thus, grounding can be achieved without making the fuel port 12 out of electrically conductive material.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. Fuel port structure of a fuel pump, the fuel port structure comprising:
   a fuel port having a periphery, an internal portion defining a fuel passage, and a free end,
   an electrically conductive grounding structure having a first portion disposed at least partially within the fuel passage and a second portion extending from the free end, and
   a fuel delivery tube coupled to the periphery of the fuel port at the free end thereof, the fuel delivery tube having an electrically conductive portion in contact with the second portion of the grounding structure to provide a discharge path for static electricity created when fuel flows through the fuel passage,
   wherein the fuel passage is generally annular, the first portion of the grounding structure being of generally cylindrical shape, the second portion being an annular rim bending over the free end of the fuel port so as to cover a portion of the periphery thereof, and
   wherein the grounding structure is in press-fit engagement with the fuel port.

2. The fuel port structure of claim 1, wherein an inner surface of the tube defines the electrically conductive portion, the annular rim being in contact with the inner surface.

3. The fuel port structure of claim 1, wherein the tube is convoluted with an inner surface defining the electrically conductive portion.

4. The fuel port structure of claim 1, wherein the periphery of the fuel port includes a plurality of barbs, an inner surface of the tube engaging the barbs.

5. The fuel port structure of claim 1, wherein the grounding structure is made of metal.

6. The fuel port structure of claim 1, in combination with a fuel pump, the fuel port defining an outlet port of the fuel pump.

7. Fuel port structure of a fuel pump, the fuel port structure comprising:
   a fuel port having a periphery, an internal portion defining a fuel passage, and a free end,
   means for electrically grounding associated with the fuel port,
   a fuel delivery tube coupled to the periphery of the fuel port at the free end thereof, the fuel delivery tube having an electrically conductive portion in contact with the means for electrically grounding to provide a discharge path for static electricity created when fuel flows through the fuel passage,
   wherein the means for electrically grounding has a first portion disposed at least partially within the fuel passage and a second portion extending from the free end, the second end contacting the electrically conductive portion of the tube,
   wherein the fuel passage is generally annular, the first portion of the means for electrically grounding being of generally cylindrical share, the second portion being an annular rim bending over the free end of the fuel port so as to cover a portion of the periphery thereof, and
   wherein the means for electrically grounding is in press-fit engagement with the fuel port.

8. The fuel port structure of claim 7, wherein an inner surface of the tube defines the electrically conductive portion, the annular rim being in contact with the inner surface.

9. The fuel port structure of claim 7, wherein the tube is convoluted with an inner surface defining the electrically conductive portion.

10. The fuel port structure of claim 7, wherein the means for electrically grounding is member made of metal.

11. The fuel port structure of claim 7, in combination with a fuel pump, the fuel port defining an outlet port of the fuel pump.

12. A method of grounding a fuel port of a fuel pump, the fuel port having a periphery, an internal portion defining a fuel passage, and a free end, the method including:
   inserting a first portion of an electrically conductive grounding structure into fuel passage with a second portion of the grounding structure extending from the free end of the fuel port and accessible at the periphery of the fuel port, and
   coupling a tube to the periphery of the fuel port at the free end thereof such that an electrically conductive portion of the tube contacts the second portion of the grounding structure to provide a discharge path for static electricity created when fuel flows through the fuel passage,
   wherein the fuel passage is generally annular, and wherein the inserting step includes inserting the first portion, of generally cylindrical shape into the annular fuel passage with the second portion, defining an annular rim bending over the free end of the fuel port so as to cover a portion of the periphery thereof, and
   wherein the first portion of the grounding structure is press-fitted into the fuel passage.

13. The method of claim 12, wherein the tube is a convoluted tube having an inner surface that defines the electrically conductive portion.

* * * * *